(12) United States Patent
Suzuki

(10) Patent No.: US 6,269,580 B1
(45) Date of Patent: Aug. 7, 2001

(54) MOTOR-DRIVEN FOCUSING APPARATUS OF A SIGHTING TELESCOPE

(75) Inventor: Shinichi Suzuki, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/417,623

(22) Filed: Oct. 14, 1999

(30) Foreign Application Priority Data

Oct. 14, 1998 (JP) .................................................. 10-291956

(51) Int. Cl.[7] ....................................................... F41G 1/38
(52) U.S. Cl. ............................... 42/119; 89/203; 359/694; 359/422; 359/429
(58) Field of Search ..................................... 359/429, 426, 359/422; 42/119; 33/245, 246

(56) References Cited

U.S. PATENT DOCUMENTS

| | | | |
|---|---|---|---|
| 3,782,822 | * 1/1974 | Spence | 356/21 |
| 5,180,875 | * 1/1993 | Berry, Jr. et al. | 42/101 |
| 5,276,654 | * 1/1994 | Nassivera | 359/694 |
| 5,388,005 | * 2/1995 | Wilson | 359/694 |
| 5,528,847 | * 6/1996 | Fisher et al. | 42/101 |
| 5,796,517 | 8/1998 | Sensui et al. | 359/426 |
| 5,844,231 | 12/1998 | Suzuki et al. | 250/201.2 |
| 5,872,661 | 2/1999 | Suzuki et al. | 359/698 |
| 5,877,892 | 3/1999 | Nakamura et al. | 359/426 |
| 5,903,996 | * 5/1999 | Morley | 42/103 |

* cited by examiner

Primary Examiner—Charles T. Jordan
Assistant Examiner—Denise J Buckley
(74) Attorney, Agent, or Firm—Greenblum & Bernstein, P.L.C.

(57) ABSTRACT

A motor-driven focusing apparatus of a telescope, includes a telescopic optical system which includes a focusing lens group guided along an optical axis; a motor-driven lens moving device which drives the focusing lens group along the optical axis; a manual operating switch for actuating the motor-driven lens moving device; and a lens-control device for controlling the motor-driven lens moving device when the manual operating switch is turned ON, so that the moving amount per unit time of a focal point of the telescopic optical system, that is caused by a movement of the focusing lens group, is kept substantially at a constant speed regardless of the position of the focusing lens group on the optical axis, the constant speed being selected from one or more constant speeds.

12 Claims, 6 Drawing Sheets

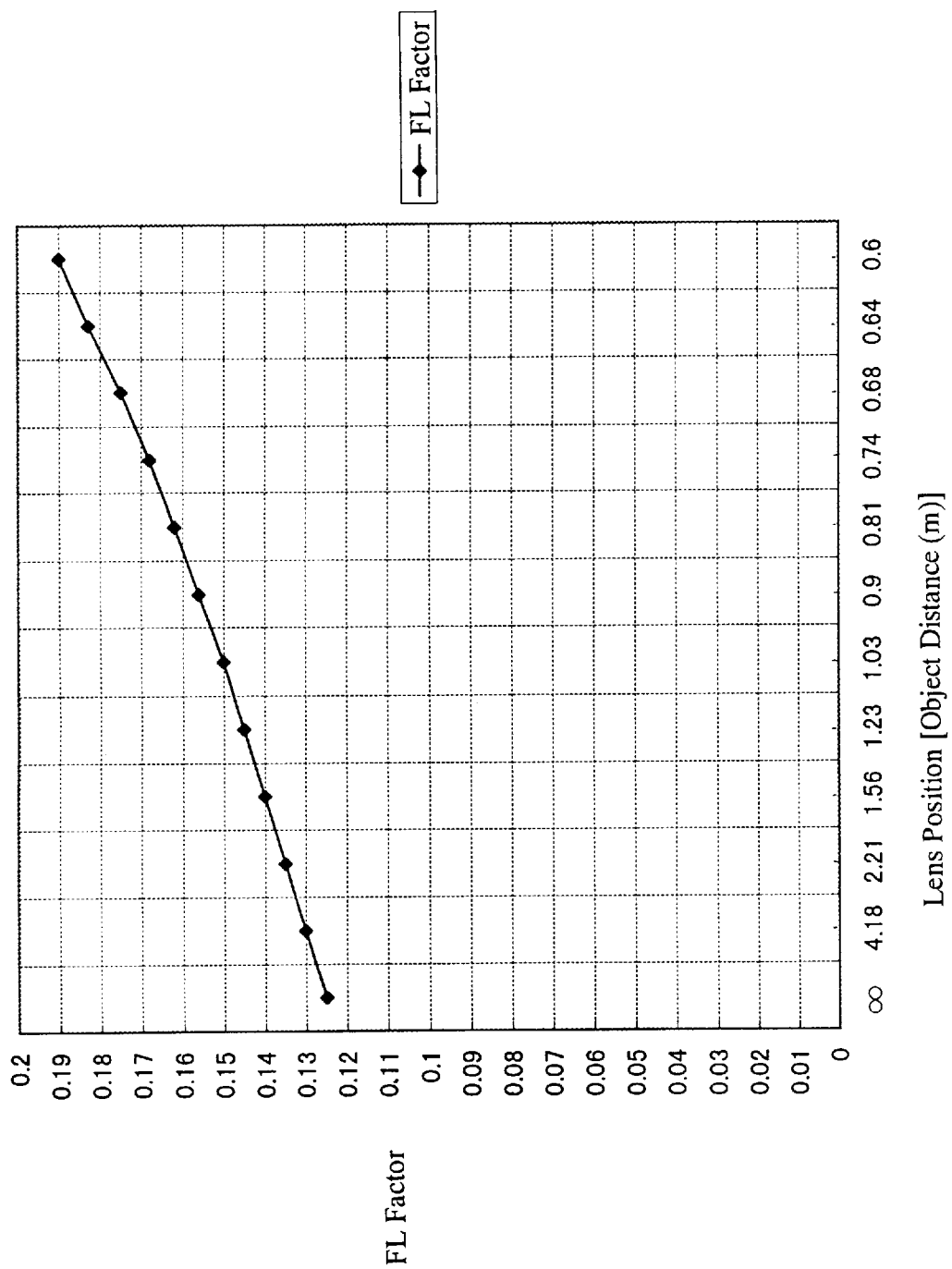

MOTOR-DRIVEN FOCUSING APPARATUS OF A SIGHTING TELESCOPE

BACKGROUND OF THE INVENTION

1. Field of the Invention

The present invention relates to a motor-driven focusing apparatus which has a manual operating switch to finely adjust the focal point of a telescopic optical system of a sighting telescope incorporated in a surveying instrument such as an automatic level, a transit, a theodolite, etc.

2. Description of the Related Art

A conventional surveying instrument such as an automatic level (auto-level), a transit, a theodolite, etc., is generally provided with a sighting telescope (collimating telescope), a level and a measuring device which measures a rotational angle, a descending angle, and an ascending angle, etc. When this type of surveying instrument is used, the sighting telescope is positioned horizontally and subsequently the horizontal and vertical adjustments for the sighting telescope are performed. Thereafter, the sighting telescope is aimed at a reference object or a reference point so that the reference object is sighted by a surveyor.

For instance, the optical system of the sighting telescope of an automatic level includes an objective lens group, a focusing lens group and an eyepiece, arranged in that order from the object side. The position of the focusing lens group is adjusted depending on the object distance, so as to form a sharp object image on the reticle provided on the focal plane. The object image formed on the reticle can be viewed through the eyepiece.

The amount of movement of the focal point per unit amount of movement of the focusing lens group varies depending upon the axial position of the focusing lens group on the optical axis thereof. FIG. 7 shows an example of the relationship between the axial position of the focusing lens group (the object distance) and the FL factor. The FL factor represents the amount of movement of the focal point when the focusing lens group moves by a unit amount of movement; namely, the FL factor represents the value of the amount of movement of the focusing lens group divided by the amount of movement of the focal point. The vertical axis of the graph shown in FIG. 7 represents the FL factor while the horizontal axis of the graph represents the axial position of the focusing lens group wherein the image of an object positioned at the indicated object distance (meters) is focused on the reticle. It can be understood from the graph shown in FIG. 7 that the amount of movement of the focal point is not always proportional to the amount of movement of the focusing lens group.

Due to this fact, in the case of a sighting telescope provided with a motor-driven focusing apparatus (auxiliary focusing apparatus) used for finely adjusting the focal point to form a sharp object image on the reticle by operating a manual operating switch (e.g., a controlling knob or lever) of the motor-driven focusing apparatus after the object is brought into focus by the autofocusing mechanism of the sighting telescope, it is difficult to finely adjust the focal point to form a sharp object image on the reticle with the motor-driven focusing apparatus since the amount of movement of the focal point per unit amount of movement of the focusing lens group varies depending on the axial position of the focusing lens group on the optical axis thereof.

SUMMARY OF THE INVENTION

The primary object of the present invention is to provide a motor-driven focusing apparatus of a sighting telescope that makes it possible to finely adjust the focal point easily.

To achieve the object mentioned above, according to an aspect of the present invention, there is provided a motor-driven focusing apparatus of a telescope, including: a telescopic optical system which includes a focusing lens group guided along an optical axis; a motor-driven lens moving device which drives the focusing lens group along the optical axis; a manual operating switch for actuating the motor-driven lens moving device; and a lens-control device for controlling the motor-driven lens moving device when the manual operating switch is turned ON, so that the moving amount per unit time of a focal point of the telescopic optical system, that is caused by a movement of the focusing lens group, is kept substantially at a constant speed regardless of the position of the focusing lens group on the optical axis, the constant speed being selected from one or more constant speeds.

According to this structure, the amount of movement of the focal point (i.e., the amount of variation in the degree of image-blurring) is substantially proportional to the manipulated variable of the manual operating switch regardless of the axial position of the focusing lens group on the optical axis, which makes it possible to finely adjust the focal point easily.

Preferably, the manual operating switch includes a speed changing function that can change the moving amount per unit time of a focal point of the telescope via the motor-driven lens moving device by the constant speed selected from one or more constant speeds.

Preferably, there is also provided a lens-position detector for detecting the position of the focusing lens group on the optical axis; and a memory in which compensation data for compensating an amount of driving of the focusing lens group for each position of the focusing lens group on the optical axis within a movable range of the focusing lens group is stored. The lens-control device inputs data from the compensation data stored in the memory for compensating the amount of driving of the focusing lens group for a position of the focusing lens group that is detected by the lens-position detector, so as to control the motor-driven lens moving device in accordance with the input data.

Preferably, there is also provided a lens-position detector for detecting the position of the focusing lens group on the optical axis; and a memory which stores a formula for calculating compensation data for compensating an amount of driving of the focusing lens group for each position of the focusing lens group on the optical axis within a movable range of the focusing lens group. The lens-control device calculates the compensation data with the formula in accordance with the position of the focusing lens group that is detected by the lens-position detector to control the motor-driven lens moving device in accordance with the compensation data.

Preferably, the motor-driven focusing apparatus is incorporated in a surveying instrument.

Preferably, the manual operating switch includes a rotatable control lever.

Preferably, the telescope includes an autofocusing system having an AF start switch that is actuated to bring a sighting object into focus upon the AF start switch being turned ON.

According to another aspect of the present invention, there is provided a sighting telescope incorporated in a surveying instrument, including: a telescopic optical system which includes a focusing lens group guided along an optical axis; an autofocusing system which starts moving the focusing lens group along the optical axis to bring a sighting object into focus upon an AF start switch being turned ON;

a motor-driven auxiliary focusing apparatus that moves the focusing lens group along the optical axis to finely adjust the position of the focusing lens group on the optical axis, the motor-driven auxiliary focusing apparatus including an manual operating switch that is operated to actuate the motor-driven auxiliary focusing apparatus; and a lens-control device for controlling the motor-driven auxiliary focusing apparatus, when the manual operating switch is turned ON, so that the moving amount per unit time of a focal point of the telescopic optical system, that is caused by a movement of the focusing lens group, is kept substantially at a constant speed regardless of the position of the focusing lens group on the optical axis, the constant speed being selected from one or more constant speeds.

Preferably, the manual operating switch includes a speed changing function that can change the moving amount per unit time of a focal point of the telescope via the motor-driven lens moving device by the constant speed selected from one or more constant speeds.

Preferably, there is also provided a lens-position detector for detecting the position of the focusing lens group on the optical axis; and a memory in which compensation data for compensating an amount of driving of the focusing lens group for each position of the focusing lens group on the optical axis within a movable range of the focusing lens group is stored. The lens-control device inputs data from the compensation data stored in the memory for compensating the amount of driving of the focusing lens group for a position of the focusing lens group that is detected by the lens-position detector, so as to control the motor-driven lens moving device in accordance with the input data.

Preferably, there is also provided a lens-position detector for detecting the position of the focusing lens group on the optical axis; and a memory which stores a formula for calculating compensation data for compensating an amount of driving of the focusing lens group for each position of the focusing lens group on the optical axis within a movable range of the focusing lens group. The lens-control device calculates the compensation data with the formula in accordance with the position of the focusing lens group that is detected by the lens-position detector to control the motor-driven lens moving device in accordance with the compensation data.

Preferably, the manual operating switch includes a rotatable control lever.

The present disclosure relates to subject matter contained in Japanese Patent Application No. 10-291956 (filed on Oct. 14, 1998) which is expressly incorporated herein by reference in its entirety.

BRIEF DESCRIPTION OF THE DRAWINGS

The present invention will be described below in detail with reference to the accompanying drawings in which:

FIG. 7 is a graph showing an example of the relationship between the axial position of a focusing lens group and the FL factor.

DESCRIPTION OF THE PREFERRED EMBODIMENT

Figure 1:
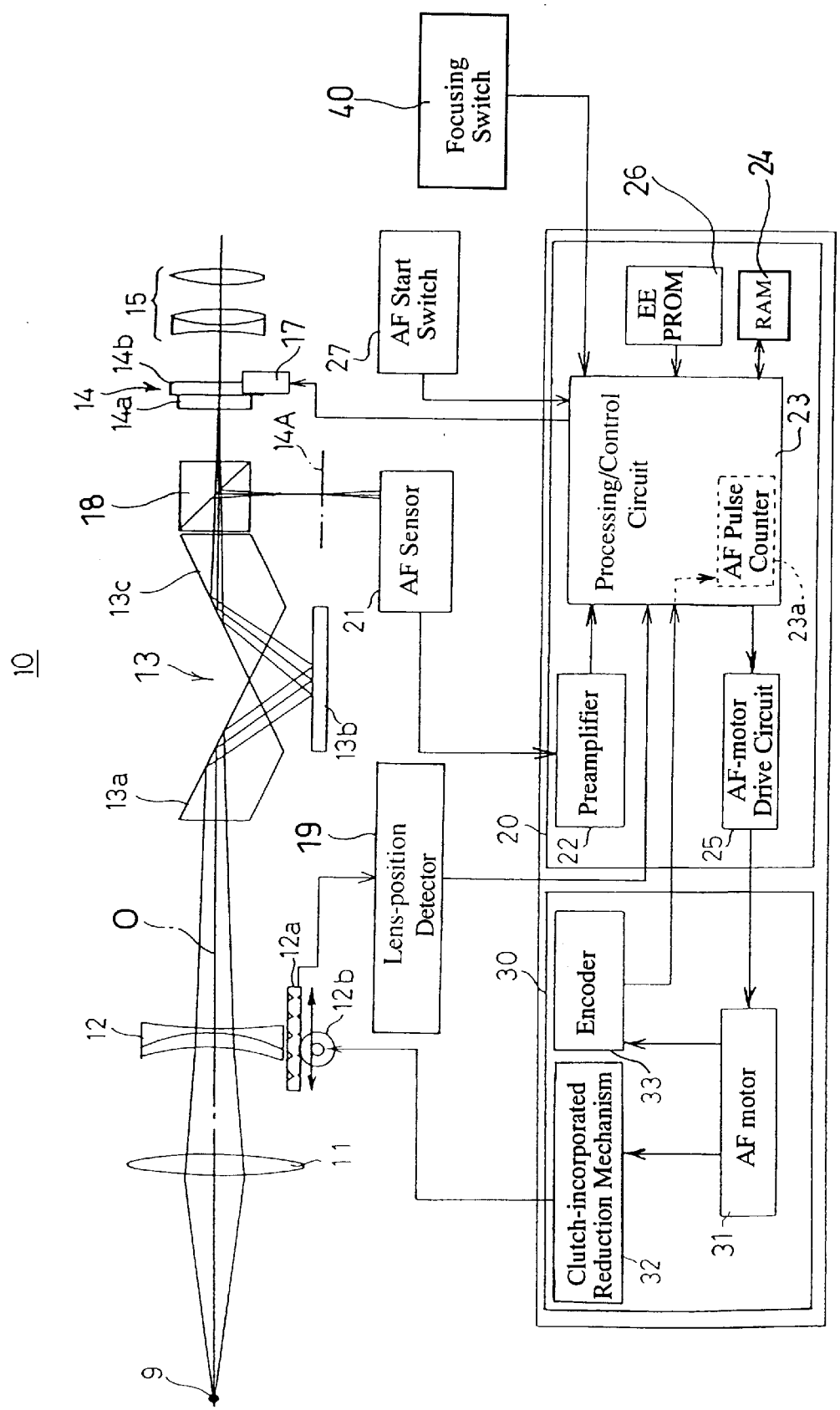
FIG. 1 is a schematic diagram showing fundamental elements of an embodiment of an automatic level to which the present invention is applied.

FIG. 1 shows an embodiment of an automatic level to which the present invention is applied. The automatic level (surveying apparatus) 10 is provided with a telescopic optical system (sighting telescope) which includes a positive objective lens group 11, a negative focusing lens group 12, a horizontal compensating optical system 13, a reticle plate (focal plane) 14, and a positive eyepiece lens 15, in that order from the object side (i.e., left to right in FIG. 1). The reticle plate 14 is composed of a first plate 14a and a second plate 14b.

The horizontal compensating optical system 13, per se known, is provided with a first compensating prism 13a, a compensating mirror 13b and a second compensating prism 13c, and has a symmetrical shape with respect to the center of the compensating mirror 13b. The horizontal compensating optical system 13 hangs from a cord/string (not shown) attached to a shaft (not shown).

The absolute angles between the compensating mirror 13b and the first and second compensating prisms 13a and 13c are the same; however, the signs (i.e., "+" or "−") of the actual angles thereof are the opposite. The value angle of the compensating mirror 13b relative to either compensating prism can be, for example, thirty degrees (30°). This angle varies depending on predetermined factors such as the length of the above-mentioned cord/string from which the horizontal compensating optical system 13 hangs. If the automatic level is set with an optical axis O of the objective lens group 11 and the focusing lens group 12 extending almost horizontally but being slightly inclined to a real horizontal plane by an angle ten to fifteen minutes, the light beam that is passed through the objective lens group 11 and the focusing lens group 12 to be incident on the first compensating prism 13a is also inclined to the real horizontal plane by the same angle. However, the light beam that emerges from the second compensating prism 13c after having been reflected by the first compensating prism 13a, the compensating mirror 13b and the second compensating prism 13c, has substantially no inclination relative to the real horizontal plane.

A rack 12a is fixed to the focusing lens group 12, while a pinion 12b is engaged with the rack 12a (the rack 12a and the pinion 12b constituting a motor-driven lens moving device), so that rotating the pinion 12b causes the focusing lens group 12 to move along the optical axis O via the rack 12a . Therefore, the image of an object (sighting object) 9 that is formed through the objective lens group 11 and the focusing lens group 12 can be moved along the optical axis by rotating the pinion 12b. The user of the automatic level 10 sights the image of the object 9 which is focused on the reticle plate 14, together with, for example, a collimation axis formed on the reticle plate 14.

The automatic level 10 is provided between the second compensating prism 13c and the reticle plate 14 with a beam splitter (half-mirror) 18 that splits a bundle of light incident thereon into two light bundles. Part of the light emitted from the horizontal compensating optical system 13 is reflected by the beam splitter 18 at right angles towards a focus detecting sensor (AF sensor) 21 provided near the beam splitter 18. Between the beam splitter 18 and the focus detecting sensor 21 is formed a reference focal plane 14A which is located at a position optically equivalent to the position at which the reticle plate 14 is placed.

The automatic level 10 is further provided with a focus state detecting system 20 and a focusing lens group driving system 30. An AF start switch 27, the AF sensor 21, the focus state detecting system 20, the focusing lens group driving system 30, the rack 12a, the pinion 12b and the focusing lens group 12 constitute an autofocusing system. The focus state detecting system 20 detects the focus state on the reference focal plane 14A via an AF sensor 21 which is positioned in the vicinity of the reference focal plane 14A. The focusing lens group driving system 30 controls the focusing lens group 12 to move along the optical axis O in accordance with the signals received from the focus state detecting system 20. The position of the focusing lens group 12 on the optical axis O is detected using a lens-position detector 19. The lens-position detector 19 detects the position of the rack 12a and outputs the detected results to a processing/control circuit (lens-control device) 23.

The focus state detecting system 20 is composed of a preamplifier 22, the above-mentioned processing/control circuit 23, a RAM 24, an AF-motor drive circuit 25 and an EEPROM 26. The focusing lens group driving system 30 is composed of an AF motor 31, a clutch-incorporated reduction mechanism 32 and an encoder 33. The focus state detecting system 20, the structure thereof being known in the art, detects the focus state (in-focus or out-of-focus state, front or rear focus, and amount of defocus) in accordance with the signals output from the AF sensor 21. In this embodiment the AF sensor 21 is of a phase-difference detection type and includes a condenser lens, a pair of separator lenses, and a pair of line sensors (e.g., multi-segment CCD sensors) located behind the respective separator lenses (all not shown). The pair of separator lenses are arranged apart from each other by the base length. The image of the object formed on the reference focal plane 14A is separated into two by the pair of separator lenses to be respectively formed on the pair of line sensors. Each of the pair of line sensors includes an array of photoelectric converting elements. Each photoelectric converting element converts the received light of an image into electric charges which are integrated (accumulated) and output as an integrated electric charge to the preamplifier 22 to constitute AF sensor data. The preamplifier 22 amplifies the input electric charge and outputs the an amplified electric charge to the processing/control circuit 23. The processing/control circuit 23, provided as an element of the focus state detecting system 20, calculates an amount of defocus through a predetermined defocus operation in accordance with the AF sensor data input from the pair of line sensors. Furthermore, in this embodiment the amount of driving of the AF motor 31 (the number of pulses output from the encoder 33, i.e., the number of AF pulses) and the driving direction thereof which are necessary for moving the focusing lens group 12 to an axial position thereof, at which the amount of defocus becomes zero, are respectively calculated and determined in accordance with the amount of defocus calculated by the processing/control circuit 23. The number of AF pulses is registered in an AF pulse counter 23a in the processing/control circuit 23.

The processing/control circuit 23 is connected to an AF start switch (AF start operational button) 27 which is positioned on a body of the automatic level 10. The AF start switch 27 is a self-reset push button switch. Autofocusing process starts upon the AF start switch being manually depressed, i.e., upon the AF start switch being turned ON from OFF. In the autofocusing process, the processing/control circuit 23 drives the AF motor 31 via the AF-motor drive circuit 25 in accordance with the calculated number of AF pulses which has been registered in the AF pulse counter 23a and the determined driving direction of the AF motor 31. Rotation of the AF motor 31 is transmitted to the pinion 12b via the clutch-incorporated reduction mechanism 32 to move the focusing lens group 12. Rotation of the AF motor 31 is detected by the encoder 30 while the output of the encoder 30 is counted by the processing/control circuit 23 to control the rotational speed of the AF motor 31 or stop the AF motor 31 in accordance with the counted output value and the aforementioned calculated amount of driving of the AF motor 31.

The processing/control circuit 23 controls the focus state detecting system 20 and the focusing lens group driving system 30 to detect the focus state of the object image formed on the reference focal plane 14A and subsequently moves the focusing lens group 12 along the optical axis O to bring the sighting object into focus.

The RAM 24, provided in the focus state detecting system 20, stores the position of the focusing lens group 12 on the optical axis O (data of the axial position of the focusing lens group 12 or the position of the rack 12a) that is detected by the lens-position detector 19. Upon completion of the autofocusing process which starts when the AF start switch 27 is depressed once and in which the focusing lens group 12 is moved to bring the sighting object into focus, the position (first position) of the focusing lens group 12 (data of the axial position of the focusing lens group 12), that is obtained after the autofocusing process, is stored in the RAM 24. Thereafter, if the AF start switch 27 is depressed again within a predetermined period of time (e.g., approximately 0.5~1 sec.) after the AF start switch 27 has been depressed once, the focusing lens group 12 is moved to a position (second position) other than the previous position (first position) of which the axial position data thereof has been stored in the RAM 24, to bring the sighting object into focus. Thereafter, the current position (second position) of the focusing lens group 12 is again stored in the RAM 24. Subsequently, every time the AF start switch 27 is depressed within the predetermined period of time, the focusing lens group 12 is moved to a position (e.g., third position) other than the previous positions obtained thus far, to bring the sighting object into focus.

If the AF start switch 27 is not depressed again within the predetermined period of time after the AF start switch 27 has been depressed, all the axial position data stored in the RAM 24 are erased. Accordingly, every time the AF start switch 27 is depressed within the predetermined period of time after the AF start switch 27 is previously depressed, the focusing lens group 12 is moved to a position other than the previous position (or positions) on the optical axis O. According to this control method, if the user judges, by viewing through the eyepiece 15, that the object being sighted is out-of-focus after the autofocusing process is performed once upon the AF start switch 27 being depressed once, the focusing lens group 12 is moved to an axial position other than the previous axial positions thereof if the AF start switch 27 is depressed again within a predetermined period of time. This prevents the autofocusing process from being unnecessarily repeated at the same axial position at which an in-focus state cannot be obtained.

Figure 5:
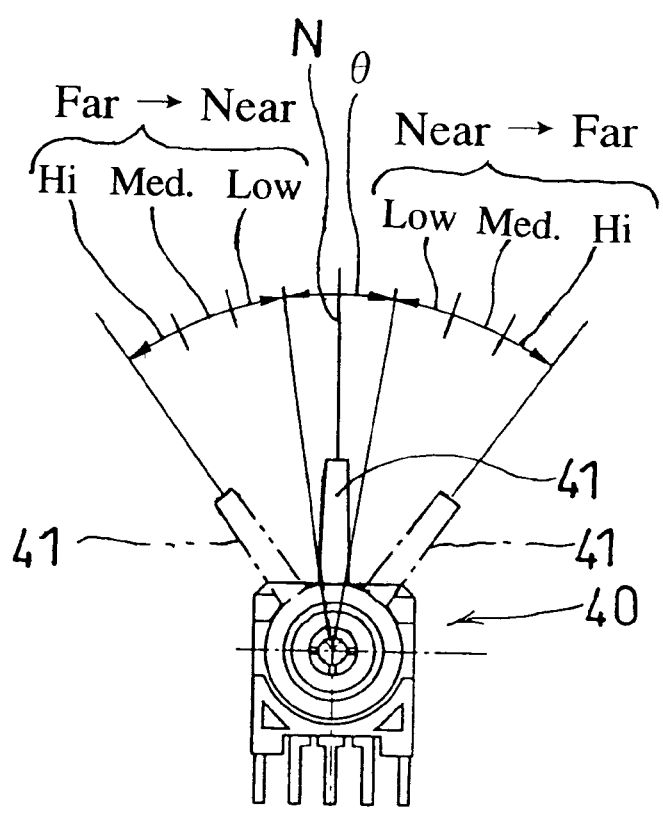
FIG. 5 is a front elevational view of a focusing switch having a control lever.
Figure 6:
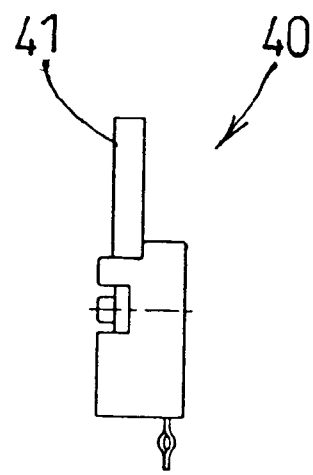
FIG. 6 is a side elevational view of the focusing switch shown in FIG. 5.

The automatic level 10 is provided on the body thereof with a focusing switch (a manual operating switch) 40 which is electrically connected to the processing/control circuit 23 (see FIG. 5). The focusing switch 40 is an element of a motor-driven focusing mechanism (motor-driven auxiliary focusing apparatus) used for finely adjusting the focal point of the telescopic optical system to form a sharp object image on the reticle plate 14 after the object is brought into focus by the autofocusing process. The focusing switch 40 is provided with a manually-operable control lever (rotatable control lever) 41. The processing/control circuit 23 drives the AF motor 31 via the AF-motor drive circuit 25 in accordance with the amount of rotation (manipulated variable) and the rotational direction of the control lever 41 to move the focusing lens group 12 along the optical axis O. In other words, the focusing switch 40 has a speed changing function for changing the speed of movement of the focusing lens group 12 along the optical axis O.

The control lever 41 stays at a neutral position N thereof when in a free state. The control lever 41 is automatically returned to the neutral position N by a spring such as a torsion spring (not shown) immediately after the control lever 41 is released upon being manually rotated. The control lever 41 is rotatable within a predetermined rotational angle (between the position of the control lever 41 shown by one-dot chain line and the position of the control lever 41 shown by two-dot chain line) with the neutral position being positioned at the center of the predetermined rotational angle. The focusing switch 40 remains OFF as long as the control lever 41 is rotatably positioned within a central range of rotational angle which includes the neutral position at the center thereof. Namely, once the control lever 41 rotates by a rotational angle beyond the central range of rotational angle the focusing switch 40 is turned ON. In the illustrated embodiment shown in FIG. 5, rotating the control lever 41 clockwise from the neutral position N causes the focal point (the focusing lens group 12) to move in the direction from near to far, while rotating the control lever 41 counterclockwise from the neutral position N causes the focal point (the focusing lens group 12) to move in the other direction from far to near. In the case where the focusing switch 40 is turned ON by a rotation of the control lever 41 in either rotational direction, the speed of movement of the focusing lens group 12 increases as the rotational angle of the control lever 41 increases. Specifically, the speed of movement of the focal point (the focusing lens group 12) increases stepwise from low, medium to high as the rotational angle of the control lever 41 increases as can be seen in FIG. 5.

A table for obtaining compensation data for compensating the amount of driving of the AF motor 31 for each axial position of the focusing lens group 12 on the optical axis O within the movable range thereof is stored in the EEPROM 26, which is connected to the process/control circuit 23. Upon the focusing switch 40 being operated, the processing/control circuit 23 reads compensation data for compensating the amount of driving of the AF motor 31, from the EEPROM 26, for the current axial position of the focusing lens group 12 that is detected by the lens-position detector 19, to control the rotation of the AF motor 31. The compensation data (FL factor), that is prestored in the EEPROM 26 and used when the AF motor 31 is driven, is calculated by obtaining the relationship between the position of the focusing lens group 12 and the ratio of the amount of movement of the focal point to the amount of movement of the focusing lens group 12, from the optical design data of the telescopic optical system.

In other words, the compensation data (FL factor) shown, for example, in FIG. 7 is defined by the following formula:

$$y = 0.017x + 0.200$$

(x=Lens Position; y=FL factor).

The compensation data (FL factor) can either be read out from a table stored in the EEPROM, or can be calculated by the above formula which is stored in the EEPROM.

Figure 3:
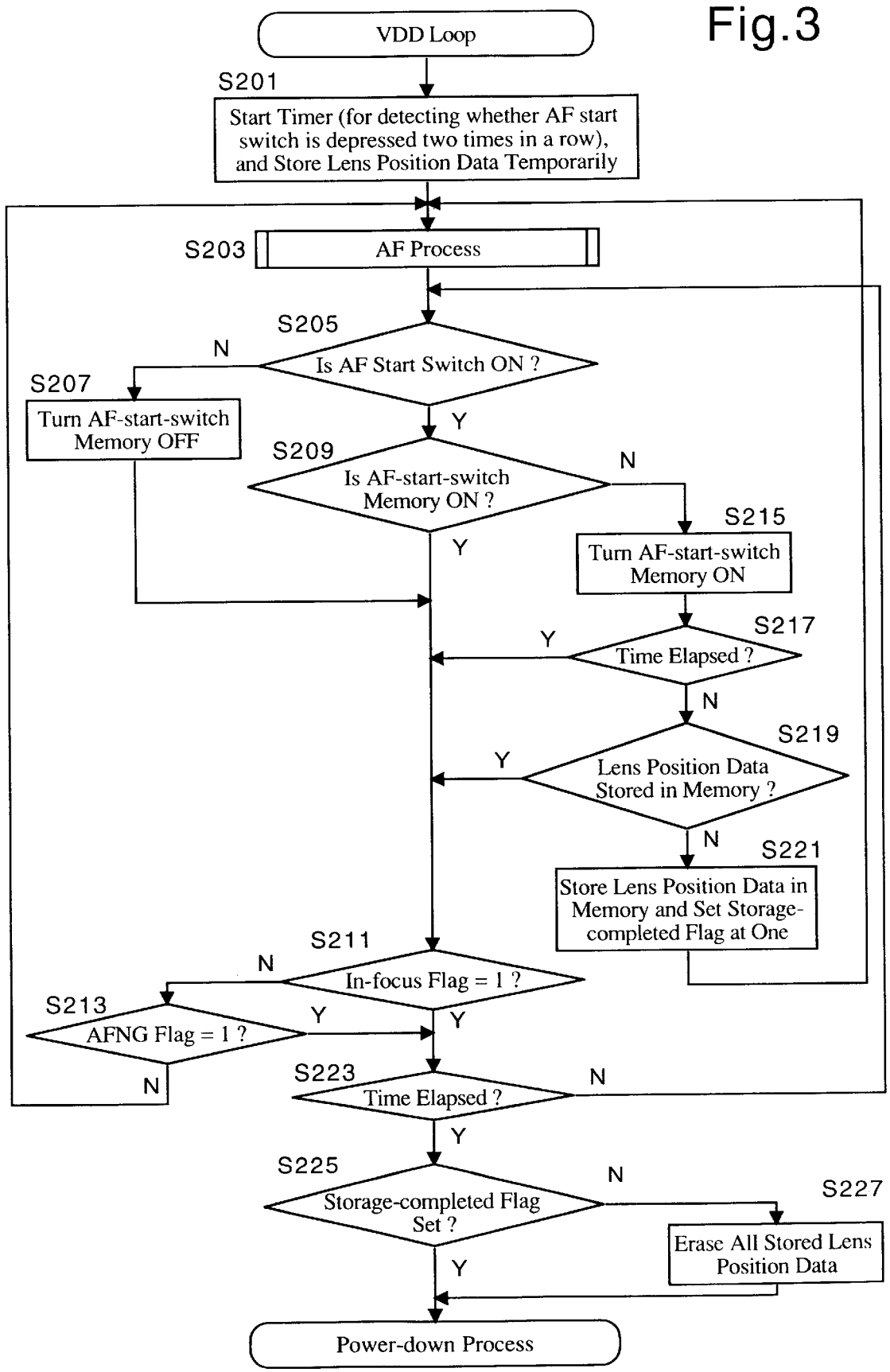
FIG. 3 is a flow chart showing another part of the autofocusing operation (VDD LOOP) that is performed in the automatic level shown in FIG. 1.
Figure 4:
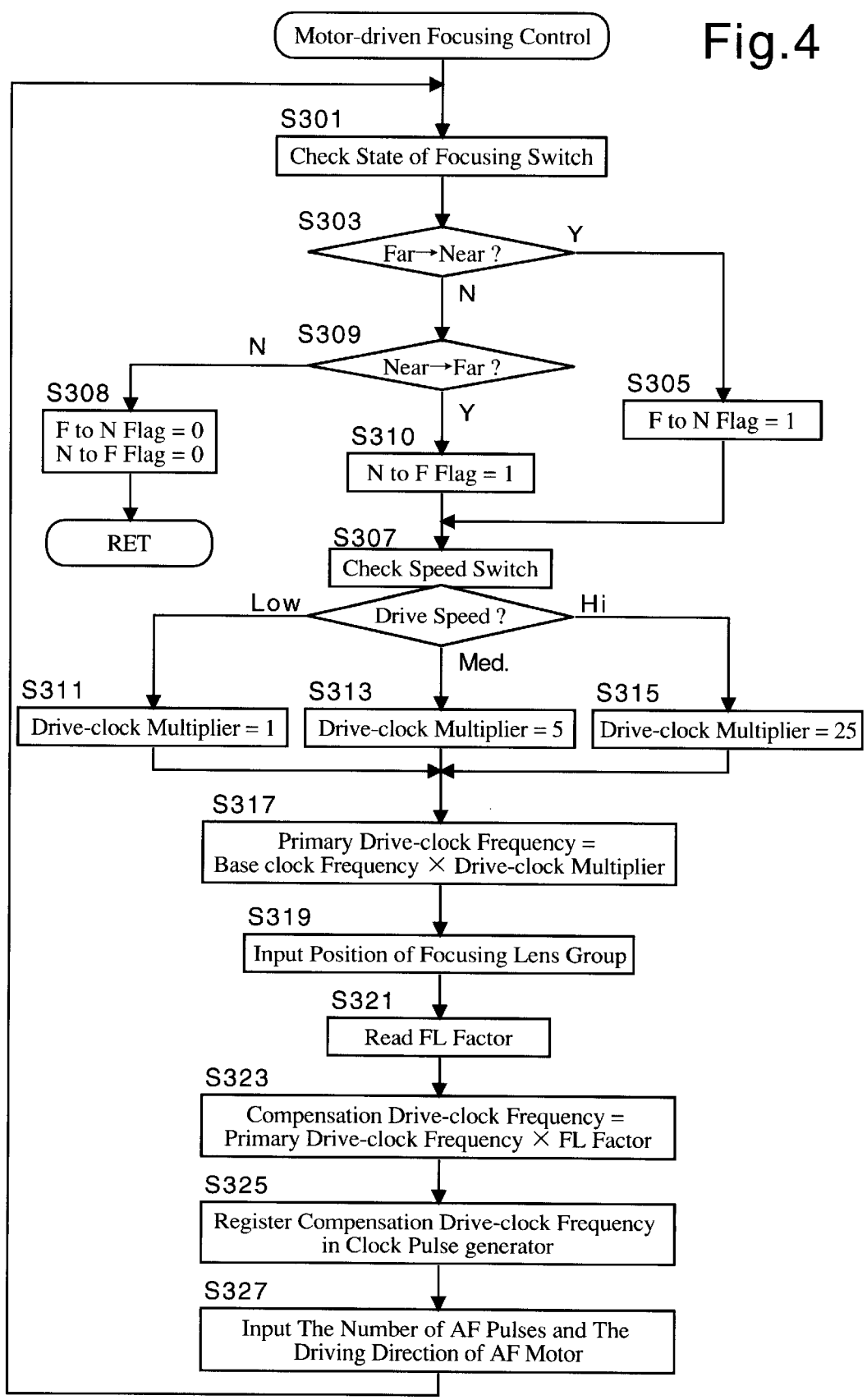
FIG. 4 is a flow chart showing another part of the autofocusing operation (MOTOR-DRIVEN FOCUSING CONTROL) that is performed in the automatic level shown in FIG. 1.

An embodiment of the autofocusing operation performed in the automatic level 10 will be hereafter discussed with reference to FIGS. 2 through 4. This autofocusing operation is performed by the processing/control circuit 23 in a state wherein a battery (not shown) for supplying power to the automatic level 10 is loaded in the automatic level 10.

Immediately after the battery is loaded in the automatic level 10, the processing/control circuit 23 initializes the RAM 24 and each of input/output ports (not shown) at step S101 and subsequently performs a power down process. Thereafter, the operation at step S101 is not performed again unless the battery is taken out of the automatic level 10 and re-loaded therein.

The power down process is a "stand-by process" which waits for the AF start switch 27 to be operated with all the circuits except for the processing/control circuit 23 being turned OFF while the AF start switch 27 is not operated, and turns the power ON to perform the autofocusing process (step S203) upon the AF start switch 27 being turned ON. The autofocusing process can be any convention AF process known in the art.

In the power down process, all the flags regarding the autofocusing operation are set to zero (step S111). The flags regarding the autofocusing operation include an in-focus flag which indicates that an in-focus state has been obtained, an autofocus NG flag (AFNG flag) that indicates that an in-focus state could not be obtained, a re-integral flag that indicates that the integrating operation has been performed after an in-focus state has been obtained, a currently-searching flag and an overlapping-operation flag indicating that each integrating operation has been performed while the focusing lens group 12 is moving, and a storage-completed flag that indicates that the lens position has already been stored in memory.

After the operation at step S111 is completed, it is determined whether the AF start switch 27 is ON (step S113). Since the AF start switch 27 is OFF in an initial state wherein the AF start switch 27 has not been operated, an AF-start-switch memory (not shown) which is built into the processing/control circuit 23 is turned OFF; i.e., OFF-information is stored in the AF-start-switch memory (step S115). Thereafter it is determined whether the focusing switch 40 is ON (step S119). In the case where it is determined at step S119 that the focusing switch 40 is OFF, it is determined whether the power is ON (step S125). Since the power is OFF in an initial state when the AF start switch 27 is not being operated, control returns to step S113, so that the operations S113, S115, S119 and S125 are repeated until the AF start switch 27 is operated. In the case where it is determined at step S125 that the power is ON, the power is shut off and control returns to step S113.

In the case where it is determined at step S113 that the AF start switch 27 is turned ON, it is determined whether the AF-start-switch memory is ON, i.e., whether ON-information has been stored in the AF-start-switch memory (step S117). In the case where the AF-start-switch memory is OFF (the AF-start-switch memory is OFF when control first enters the operation at step S117 after it is determined at step S113 that the AF start switch 27 is turned ON), the AF-start-switch memory is turned ON, i.e., ON-information is stored in the AF-start-switch memory (step S129). Subsequently, the power is turned ON to supply power to each circuit (step S131), and thereafter control proceeds to the VDD loop process shown in FIG. 3.

Figure 2:
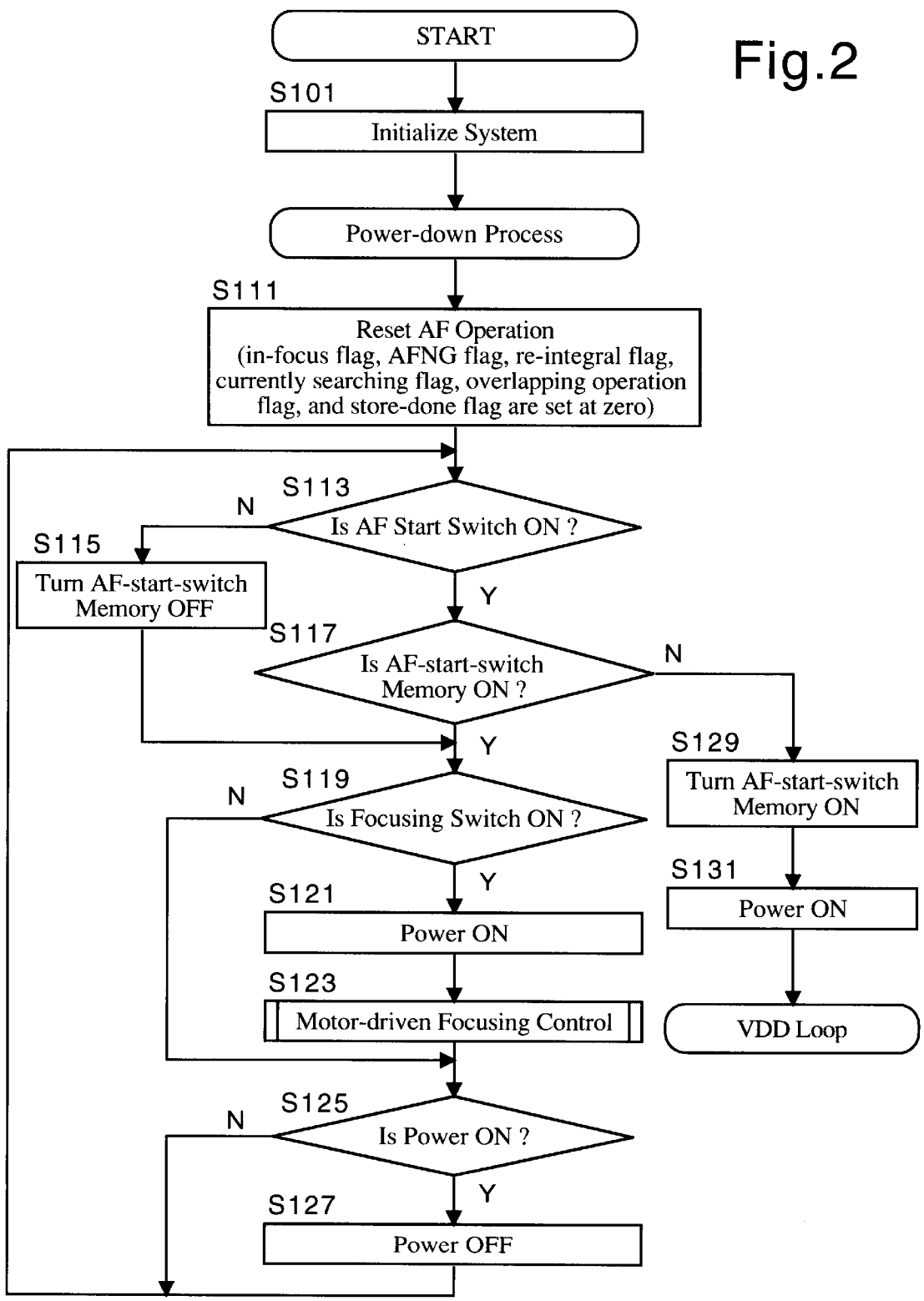
FIG. 2 is a flow chart showing part of the autofocusing operation (START) that is performed in the automatic level shown in FIG. 1.

In the VDD loop process, the autofocusing process (step S203) is performed, and control returns to the power down process shown in FIG. 2 upon determining that an in-focus state is obtained, or that it is impossible to obtain an in-focus state, while checking the state of the AF start switch 27. In the VDD loop process, firstly a timer (switch-detection-expiration timer) in the processing/control circuit 23 is actuated to start while the current axial position of the focusing lens group 12 on the optical axis O is temporarily stored in the RAM 24 (step S201). Subsequently, the autofocusing process is performed in which the amount of defocus is detected to move the focusing lens group 11 to an axial position (in-focus position) thereof (step S203). After the autofocusing process it is determined whether the AF start switch 27 is ON (step S205). Since the AF start switch 27 generally remains ON when control first enters the operation at step S205, it is determined whether the AF-start-switch memory is ON (step S209). Since the AF-start-switch memory has been turned ON at step S129, the state of each of the in-focus flag and the autofocus NG flag is checked (steps S211, S213).

In the case where it is impossible to determine that an in-focus state has been obtained, or that an in-focus state cannot be obtained in the autofocusing process at step S203, indicating that the in-focus flag and the AFNG flag are zero, control returns to the autofocusing process of step S203 (steps S211 and S213). Thereafter, the operations at steps S203, S205, S209, S211 and S213 are repeated until either the in-focus flag or the autofocus NG flag is set at one, otherwise control proceeds from step S205 to step S207 to turn the AF-start-switch memory OFF in the case where the AF start switch 27 is turned OFF, and subsequently control returns to the autofocusing process of step S203 via the operations at steps S211 and S213.

After the focusing lens group 12 is moved to an in-focus position thereof by the autofocusing process at step S203, the in-focus flag is set at one, so that control can proceed from step S211 to step S223. At step S223, it is determined whether a predetermined period of time (e.g., 0.5 sec.) has elapsed since the timer started at step S201. Control returns to step S205 if the predetermined period of time has not yet elapsed, otherwise control proceeds to step S225 wherein it is determined whether the storage-completed flag has already been set to one. In the case where the storage-completed flag has not been set to one, i.e., the storage-completed flag is zero, all the axial position data stored in the RAM 24 is erased and subsequently control returns to the power down process (step S227) to end the autofocusing operation. If it is determined at step S225 that the storage-completed flag has been set to one, control returns to the power down process to end the autofocusing operation.

If an in-focus state cannot be obtained due to reasons such as, for example, the sighting object is not still, the sighting object is too dark, and/or the contrast of the sighting object is too low; the autofocus NG flag is set to one in the autofocusing process at step S203, so that control proceeds from step S213 to step S223 (steps S211, S213).

In the VDD loop process, the AF start switch 27 is turned ON after it is turned OFF, and control proceeds from step S205 to step S209. Since the AF-start-switch memory is OFF when the AF start switch is initially OFF, control proceeds from step S209 to step S215 to turn the AF-start-switch memory ON. Thereafter, it is determined at step S217 whether the aforementioned predetermined period of time (e.g., 0.5 sec.) has elapsed since the timer starts at step S201, and control proceeds to step S219 if the predetermined period of time has not yet elapsed, otherwise control proceeds to step S211. At step S219 it is determined whether the data of the axial position of the focusing lens group 12 on the optical axis O (i.e., the data of the axial position of the focusing lens group 12 which is temporarily stored at step S201) has been stored in the RAM 24. If it is determined at step S219 that the data has not been stored in the RAM 24, the data is subsequently stored in the RAM 24 and the storage-completed flag is set to one at step S221; thereafter, control returns to the autofocusing process of step S203. Accordingly, even if it is determined at step S217 that the aforementioned predetermined period of time (e.g., 0.5 sec.) has not yet elapsed since the timer started at step S201, control proceeds to step S211 if the data has been already stored in the RAM 24.

In the case where it is determined at step S119 that the focusing switch 40 is ON, the power is turned ON and subsequently control enters an motor-driven focusing control process (steps S121 and S123). Thereafter it is determined whether the power is ON (step S125). The details of the motor-driven focusing control process will be hereinafter discussed with reference to FIG. 4.

In the motor-driven focusing control process, firstly the state of the focusing switch 40 is checked (step S301). Subsequently, it is determined whether the control lever 41 of the focusing switch 40 is currently rotated to move the focal point in a direction from far to near (step S303). If the control lever is rotated to move the focal point for far to near, an F-to-N flag is set to one, and subsequently it is determined whether the slow, med., or high speed is currently selected (steps S305 and S307). If the control lever 41 of the focusing switch 40 is currently rotated to move the focal point in the other direction from near to far, an N-to-F flag is set to one, and subsequently it is determined whether the slow, med., or high speed is currently selected (steps S303, S309, S310 and S307). If the focusing switch 40 is not currently operated to rotate in either rotational direction, or currently rotated but within the central range of rotational angle shown in FIG. 5, the F-to-N flag and the N-to-F flag are set to zero (step S308). Thereafter control returns, i.e., proceeds to step S125.

A drive-clock multiplier is set at one, five or twenty-five in the case where it is determined at step S307 that the slow speed, the medium speed or the high speed is currently selected, respectively (S311, S313 and S315). Thereafter, a primary drive clock frequency is obtained by multiplying a base clock frequency by the drive-clock multiplier (step S317). Thereafter, the data of the axial position of the focusing lens group 12 is input and subsequently the FL factor (shown in, for example, FIG. 7) is read from the EEPROM 26 which has been stored therein (steps S319 and S321). Subsequently, a compensation drive clock frequency is obtained by multiplying the primary drive clock frequency, which is registered in a clock pulse generator (not shown), by the FL factor (steps S323 and S325). Subsequently, the number of AF pulses, which has been registered in the AF pulse counter 23a, and the determined driving direction of the AF motor 31 (the direction of moving the focusing lens group), are input to the AF-motor drive circuit 25, so that the AF-motor drive circuit 25 drives the AF motor 31 in accordance with the input number of AF pulses and the determined driving direction.

According to the above described control method, the moving amount per unit time of the focal point (i.e., the amount of variation per unit time in the degree of image-blurring), when the focusing switch 40 (control lever 41) is turned ON, is kept substantially constant regardless of the axial position of the focusing lens group 12 on the optical axis O. This makes it easy to finely adjust the focal point to form a sharp object image on the reticle plate 14.

In the above illustrated embodiment, since the three speeds (low, med. and high) are set for driving the focusing lens group 12, the moving amount per unit time of the focal point is changeable in accordance with the selection of the three speeds. However, in the present invention, the number of speeds determined for driving the focusing lens group 12 is not limited to three, and can be any number of speeds including an infinitely variable speed.

In the above illustrated embodiment, the present invention is applied to an automatic level. However, the present invention can be applied to not only an automatic level but also any other surveying apparatus such as a transit, a theodolite and a total station. Furthermore, the present invention can also be applied to any telescopic optical system such as a telescope and a binocular telescope.

As can be understood from the foregoing, according to the motor-driven focusing apparatus to which the present invention is applied, since there is provided a lens-control device which controls the motor-driven lens moving device so that the moving amount per unit time of the focal point is kept substantially constant regardless of the axial position of the focusing lens group 12 on the optical axis, the focal point can be easily adjusted to form a sharp object image on the reticle.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A motor-driven focusing apparatus of a telescope, comprising:

a telescopic optical system which comprises a focusing lens group guided along an optical axis;

a motor-driven lens moving device which drives said focusing lens group along the optical axis;

a manual operating switch for actuating said motor-driven lens moving device; and a lens-control device for controlling said motor-driven lens moving device when said manual operating switch is turned ON, so that the moving amount per unit time of a focal point of said telescopic optical system, that is caused by a movement of said focusing lens group, is kept substantially at a constant speed regardless of the position of said focusing lens group on the optical axis, said constant speed being selected from one or more constant speeds.

2. The motor-driven focusing apparatus according to claim 1, wherein said manual operating switch comprises a speed changing function that can change the moving amount per unit time of a focal point of said telescope via said motor-driven lens moving device by said constant speed selected from one or more constant speeds.

3. The motor-driven focusing apparatus according to claim 1, further comprising:

a lens-position detector for detecting the position of said focusing lens group on said optical axis; and a memory in which compensation data for compensating a moving amount per unit time of said focusing lens group for each position of the focusing lens group on said optical axis within a movable range of the focusing lens group is stored;

wherein said lens-control device inputs data from said compensation data stored in said memory for compensating said amount of driving of said focusing lens group for a position of the focusing lens group that is detected by said lens-position detector, so as to control said motor-driven lens moving device in accordance with said input data.

4. The motor-driven focusing apparatus according to claim 1, further comprising:

a lens-position detector for detecting said position of said focusing lens group on said optical axis; and a memory which stores a formula for calculating compensation data for compensating an amount of driving of said focusing lens group for each position of the focusing lens group on the optical axis within a movable range of the focusing lens group;

wherein said lens-control device calculates said compensation data with said formula in accordance with said position of said focusing lens group that is detected by said lens-position detector to control said motor-driven lens moving device in accordance with said compensation data.

5. The motor-driven focusing apparatus according to claim 1, wherein said motor-driven focusing apparatus is incorporated in a surveying instrument.

6. The motor-driven focusing apparatus according to claim 1, wherein said manual operating switch comprises a rotatable control lever.

7. The motor-driven focusing apparatus according to claim 1, wherein said telescope comprises an autofocusing system having an AF start switch that is actuated to bring a sighting object into focus upon said AF start switch being turned ON.

8. A sighting telescope incorporated in a surveying instrument, comprising:

a telescopic optical system which comprises a focusing lens group guided along an optical axis;

an autofocusing system which starts moving said focusing lens group along said optical axis to bring a sighting object into focus upon an AF start switch being turned ON;

a motor-driven auxiliary focusing apparatus that moves said focusing lens group along said optical axis to finely adjust the position of said focusing lens group on said optical axis, said motor-driven auxiliary focusing apparatus comprising an manual operating switch that is operated to actuate said motor-driven auxiliary focusing apparatus; and a lens-control device for controlling said motor-driven auxiliary focusing apparatus, when said manual operating switch is turned ON, so that the moving amount per unit time of a focal point of said telescopic optical system, that is caused by a movement of said focusing lens group, is kept substantially at a constant speed regardless of the position of said focusing lens group on the optical axis, said constant speed being selected from one or more constant speeds.

9. The sighting telescope incorporated in a surveying instrument according to claim 8, wherein said manual operating switch comprises a speed changing function that can change the moving amount per unit time of a focal point of said telescope via said motor-driven lens moving device by said constant speed selected from one or more constant speeds.

10. The sighting telescope incorporated in a surveying instrument according to claim 8, further comprising:

a lens-position detector for detecting the position of said focusing lens group on said optical axis; and a memory in which compensation data for compensating an amount of driving of said focusing lens group for each position of the focusing lens group on said optical axis within a movable range of the focusing lens group is stored;

wherein said lens-control device inputs data from said compensation data stored in said memory for compensating said amount of driving of said focusing lens group for a position of the focusing lens group that is detected by said lens-position detector, so as to control said motor-driven lens moving device in accordance with said input data.

11. The sighting telescope incorporated in a surveying instrument according to claim 8, further comprising:

a lens-position detector for detecting the position of said focusing lens group on said optical axis; and a memory which stores a formula for calculating compensation data for compensating an amount of driving of said focusing lens group for each position of the focusing lens group on the optical axis within a movable range of the focusing lens group;

wherein said lens-control device calculates said compensation data with said formula in accordance with said position of said focusing lens group that is detected by said lens-position detector to control said motor-driven lens moving device in accordance with said compensation data.

12. The sighting telescope incorporated in a surveying instrument according to claim 8, wherein said manual operating switch comprises a rotatable control lever.

* * * * *